(12) United States Patent
Hikmet et al.

(10) Patent No.: US 6,680,141 B2
(45) Date of Patent: Jan. 20, 2004

(54) LITHIUM BATTERY

(75) Inventors: Rifat Ata Mustafa Hikmet, Eindhoven (NL); Hans Feil, Eindhoven (NL); Bente Adriaan Bordes, Eindhoven (NL); Martinus Jacobus Johannes Hack, Eindhoven (NL); Jan Brink, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 281 days.

(21) Appl. No.: 09/795,016

(22) Filed: Feb. 28, 2001

(65) Prior Publication Data

US 2001/0041289 A1 Nov. 15, 2001

(30) Foreign Application Priority Data

Feb. 29, 2000 (EP) .............................................. 00200704

(51) Int. Cl.⁷ .......................... H01M 2/18; H01M 6/12; H01M 6/14; H01M 10/04
(52) U.S. Cl. ........................ 429/129; 429/152; 429/162; 429/231.95; 29/623.4; 29/623.5
(58) Field of Search ................................ 429/127, 129, 429/143, 146, 147, 152, 162, 231.95; 29/623.1–623.5

(56) References Cited

U.S. PATENT DOCUMENTS 6,242,128 B1 * 6/2001 Tura et al. .................. 429/161
6,432,576 B1 * 8/2002 Hikmet ........................ 429/162
6,444,368 B1 * 9/2002 Hikmet et al. ............... 429/300
2003/0005567 A1 * 1/2003 Pommer

FOREIGN PATENT DOCUMENTS

| EP | 0613200 A1 | 8/1994 | .......... H01M/10/04 |
| WO | WO 0004601 | 1/2000 | .......... H01M/10/12 |

OTHER PUBLICATIONS

Patent Abstracts of Japan, vol. 008, No. 281, Dec. 21, 1984 (JP 59 148280).

* cited by examiner

Primary Examiner—Susy Tsang-Foster
(74) Attorney, Agent, or Firm—Dicran Halajian

(57) ABSTRACT

Disclosed are a lithium battery and methods for the manufacture thereof. Such a lithium battery includes a stack of a negative electrode, a separator, and a positive electrode. In the manufacturing methods, a pattern of holes is produced in the negative electrode as well as in the positive electrode, and a polymeric material is caused to penetrate the holes, whereby the negative electrode, the positive electrode and the separator are stuck and pressed together. Moreover, the negative electrode and the positive electrode are provided with an alignment pattern which can be used for the purpose of aligning the electrodes. The presence of such an alignment pattern facilitates the alignment of the layers with respect to each other.

21 Claims, 2 Drawing Sheets

LITHIUM BATTERY

FIELD OF THE INVENTION

The invention relates to a lithium battery comprising at least:
- a negative electrode comprising negative electrode material and a negative current collector;
- a positive electrode comprising positive electrode material and a positive current collector; and
- a separator separating the negative electrode and the positive electrode, at least the negative electrode material and the positive electrode material being provided with a pattern of holes which accommodate a polymeric material which sticks and presses the negative electrode, the positive electrode and the separator together.

The invention also relates to a method of manufacturing a lithium battery comprising a stack of a negative electrode, a separator, and a positive electrode, which method comprises the steps of applying negative electrode material on a negative current collector so as to form the negative electrode, applying positive electrode material on a positive current collector so as to form the positive electrode, and arranging a separator between the negative and the positive electrode.

BACKGROUND OF THE INVENTION

The growing market for lightweight, portable cordless consumer products, such as CD-players, mobile telephones, laptop computers, and video cameras has led to an increased demand for high-density batteries. Specifically, very thin and flexible batteries are required. In order to provide an acceptable portability, the batteries contained in said consumer products should provide the necessary amount of energy at the smallest possible weight and volume. However, the thinner the battery, the more difficult the application of a pressure needed to maintain a sufficient contact between the respective components of the battery.

A battery according to the preamble is known from the International patent application with publication number 00/04601.

Said battery has a thin and flexible shape and at the same time provides a very high energy density. Moreover, the contact between the electrodes and the separator is obtained and maintained in a very efficient way. The battery can be packed in a thinwalled canister, as the walls of said canister are not needed for maintaining a sufficient pressure on the respective components of the battery.

Lithium is a very advantageous material for use in batteries in which a high energy density is required. Lithium is the lightest of all metals, which promises an extremely high theoretical energy density of metallic lithium. Lithium is a leading contender in the field of negative battery electrode materials, since it has a large negative thermodynamic potential. Moreover, the use of lithium has no negative environmental consequences. Thus, lithium batteries are very promising, especially where weight is an important factor.

The holes in the electrode material are macroscopic holes having a diameter of, for example 1 mm. In a typical example, the pattern of holes forms a rectangular two-dimensional array with a mutual hole distance of 5 mm. The dimensions of the holes and the pattern are chosen in such a way that the active surface area of the electrodes amounts preferably to at least 90%.

The holes may be made by punching or laser cutting. The electrode material may also be directly provided with holes by means of a suitable application method, for example by means of patternwise screen printing of a paste comprising the active electrode material onto the current collector.

In the above embodiment, where only the negative electrode material and the positive electrode material are provided with a pattern of holes, the polymeric material fills said holes and simultaneously contacts the current collectors as well as the separator. The polymeric material in each of the holes acts as a plug or rivet and sticks to the separator, the electrode material, and the current collector, causing these layers to be bonded together.

SUMMARY OF THE INVENTION

It is an object of the invention to provide a battery according to the preamble which is even easier to manufacture and in which the components are aligned in a very precise manner. Moreover, it is an object of the invention to provide a method of manufacturing such a battery.

These objects are achieved in a battery as specified in the preamble, which is characterized in that at least the negative electrode and the positive electrode are provided with a pattern which can be used for the purpose of aligning the electrodes.

Providing the negative electrode and the positive electrode with such a pattern facilitates the alignment of the negative electrode with respect to the positive electrode and vice versa. The result thereof is a lithium battery according to the preamble with a very precise alignment of the respective layers.

Preferably, at least the negative electrode and the positive electrode are provided with one or more alignment holes, which advantageously differ from the pattern of holes present.

Such alignment holes can cooperate with alignment pins or similar aids, present in the device by which the battery is manufactured, in order to align the respective layers. The alignment holes may differ in size and shape from the holes already present in the respective layers.

In a particular embodiment, the pattern is provided outside the area of active material of the battery.

By providing a pattern outside the area of active material of the battery, the active surface is not further reduced. The pattern may, for example, comprise a portion of a current collector projecting outside the area of active material. In an alternative embodiment, the pattern is formed in such projecting portion.

In a particular embodiment, the current collectors are provided with a pattern of holes substantially overlapping the holes in the electrode materials, the holes of both patterns being filled with the polymeric material.

In this embodiment the holes in the electrode materials coincide with the holes in the current collector. A polymeric material can be introduced from the side of the electrodes opposite the separator, for example by melting a polymeric foil and pressing it into the electrodes. Such a melting polymer penetrates the holes, solidifies, and forms a continuous plug.

A preferred embodiment of the battery is characterized in that the separator is provided with a pattern of holes substantially overlapping the holes in the electrode materials, and in that the holes of the patterns are filled with the polymeric material.

The holes in the electrode material and the current collectors coincide with the holes in the separator. The polymeric material introduced into the holes forms a kind of rivets, which provide a bond between the electrodes and the separator.

The lithium battery consists of a positive and a negative electrode which are separated by a polymeric film to prevent electronic contact in an electrolyte. For example, a transition metal oxide, such as manganese oxide, may be used as the positive electrode, and metallic lithium as the negative electrode. The electrolyte may be a lithium salt in a non-aqueous organic solvent with good ionic conductivity and negligible electrical conductivity. During discharging of the battery, lithium ions are transported from the negative electrode towards the positive electrode. During charging, the lithium ions are transported towards and deposited on the negative electrode.

When the above lithium battery with lithium metal for the negative electrode is used as a secondary battery, i.e. a rechargeable battery, the problem of short-circuits in the battery is encountered, caused by the repetition of the charge/discharge cycles. During the charge/discharge cycles lithium metal is dissolved and deposited, which creates the possibility of the growth of lithium metal dendrites on the surface of the negative electrode. Said growing dendrites may penetrate the separator between the negative and the positive electrode and can come into contact with the positive electrode, resulting in a short-circuit.

The use of a lithium metal alloy, such as Li—Al, for the negative electrode, instead of lithium metal decreases said growth of dendrites and improves the charge/discharge characteristic.

However, a more advanced and safer approach to lithium rechargeable batteries consists in a replacement of the lithium metal or alloy-type negative electrode by a lithium intercalating compound. When another lithium intercalating compound is used as a positive electrode, this leads to a rechargeable battery free from lithium metal. Such a battery is called a Li-ion battery. During charging, lithium ions deintercalate from the positive electrode, and move into the non-aqueous electrolyte. The negative electrode subsequently intercalates these ions. During discharging the process is reversed. Both electrodes exhibit the so-called intercalation reaction, also known as the host-guest reaction. Said reaction does not involve an electrolyte concentration change, or any dissolution of the active materials in the electrolyte. The growth of dendrites is prevented in the negative carbon electrode, and the problem of a short-circuit in the battery is solved.

The negative electrode (also called anode) in the above battery basically comprises negative electrode active material for the battery reaction and a negative current collector serving to transmit electrons upon charging and discharging.

The negative electrode material is an intercalatable material, preferably carbon, such as amorphous carbon or graphite, dispersed in a polymeric binder matrix. Lithium can be intercalated between crystal layers of carbon, for example in a quantity of 1 lithium atom per 6 carbon atoms, i.e. $LiC_6$.

The positive electrode (also called cathode) comprises positive electrode active material and a positive current collector.

The positive electrode material may comprise a lithium intercalation compound, such as $LiMn_2O_4$, $LiCoO_2$ or $LiNiO_2$, dispersed in a polymeric binder matrix. The mixture also comprises a powdery conductive material, such as carbon black (e.g. acetylene black, thermal black), graphite powder, metal powder, or the like. The amount of conductive material is in the range of 2 to 15% by weight.

Polymers are used for the binder matrix, which polymers include polysaccharide, thermoplastic polymers and polymers having rubber-like elasticity. Examples are carboxymethyl cellulose, polytetrafluoroethylene, polyethylene, polypropylene and styrene-butadiene rubber. The polymers may be used singly or in combination. The polymeric binder serves to bind together active material powders to prevent cracks and fix such powdery materials to the surface of the current collector. The amount of the polymeric binder is in the range of 2 to 30% by weight.

Any electronic conductor may be used for the current collector, provided that it does not induce chemical reactions in the battery. Examples of materials for the positive current collector (cathode) are stainless steel, aluminum and nickel. Examples of materials for the negative current collector (anode) are stainless steel, copper and nickel. The collector may be in the shape of a foil, film or sheet, and may be porous, punched or mesh-like. The thickness of the collector generally is in the range of 1 to 500 μm.

The separator provided between the positive and negative electrode is an insulated film having both a high ion permeability and a desired mechanical strength. It prevents short-circuits between the negative and the positive electrode and holds the electrolytic solution. A generally used separator is made of glass fibre, or a porous sheet or non-woven fabric made of an olefin polymer such as polyethylene or polypropylene. The diameter of the pores generally is in the range of 0.01 to 10 μm. The thickness of the separator generally is in the range of 5 to 300 μm.

The battery structure of the present invention may be activated with any of the numerous compositions used as liquid electrolyte solutions. For the solvent an ester, such as ethylene carbonate, propylene carbonate, methylethylcarbonate; an ether, such as tetrahydrofurane; dimethyl sulfoxide, and mixtures thereof may be used. Examples of the solute are salts composed of lithium ions ($Li^+$) and Lewis acid ions ($BF_4^-$, $PF_6^-$, $AsF_6^-$, $ClO_4^-$, $CF_3SO_3^-$) and mixed salts thereof. The concentration of the salt is between 0.5 and 2 mole/l.

The battery according to the invention may be in the form of a flat flexible sheet-like product or it may be folded in zig-zag fashion, or wound into a cylindrical or rectangular prismatic shape. The battery may be of the single-layer or multi-layer type. The flat battery structure may be die-punched into coins for use in the familiar button batteries.

Batteries of various sizes, capacities, and voltage ranges may be obtained from the layered cell structure by overlaying a number of cells or manifolding a single cell of extended dimension. Batteries of higher capacity may be constructed by repeating the sequences of cell elements. The voltage output of a battery may be increased by series multiplexing of a plurality of the basic laminate of the layered cell structure; in that case, the negative electrode layer of the first cell structure is placed in electrical contact with the positive electrode layer of a second similar cell structure. In these embodiments the battery comprises a multilayer stack of layers of a negative electrode, a separator and a positive electrode.

The battery is enclosed in a battery case, which may be a plastic metallic or a plastic resin case. Examples of these materials are stainless steel and plastics like polypropylene. The sealing may be made by an adhesive, welding or soldering. A flat flexible battery may be enclosed in an airtight and moisture-proof bag of polymer-coated aluminum foil. Sheets of such foil are commercially available and can be sealed together at their edges. The sheets typically comprise an outer 15 µm polyester or polyethylene film, a 50 µm aluminum foil, and an inner 15 µm polyester or polyethylene film, bearing a 90 µm layer of heat sealing adhesive.

If desired, the battery according to the invention may be provided with a layer, behind the negative electrode and/or behind the positive electrode and facing away from the separator, having a spring function. This layer may be useful if the negative electrode and/or the positive electrode material undergoes a large volume change due to charging and discharging. The layer will compensate for the change in volume. This layer having a spring function is made of a resilient material and is, for example, an elastic foam, such as polyurethane, or a cross-linked polyolefin. When the negative electrode or the positive electrode gets thinner, the foam layer expands to maintain the pressure. When the volume of the negative electrode or the positive electrode expands, the foam layer is compressed.

The object of providing a method of manufacturing a lithium battery is achieved by a method of manufacturing a lithium battery comprising a stack of a negative electrode, a separator, and a positive electrode, which method comprises the steps of applying negative electrode material on a negative current collector so as to form the negative electrode, applying positive electrode material on a positive current collector so as to form the positive electrode, and arranging a separator between the negative electrode and the positive electrode, and which method comprises the following steps:

a) producing a pattern of holes in the negative electrode;
b) producing a pattern of holes in the positive electrode;
c) providing a polymeric material on the stack such that the polymeric material penetrates the holes, whereby the negative electrode, the positive electrode and the separator are stuck and pressed together. Said method is characterized in that before step c) at least the negative electrode and the positive electrode are provided with a pattern which can be used for the purpose of aligning the electrodes.

As mentioned above, the presence of such a pattern for aligning purposes of the electrodes significantly simplifies the alignment of the layers with respect to one another. Furthermore, the holes of the electrodes can be precisely aligned with respect to each other.

A first particular embodiment of the above method is characterized in that in step c) a film of a polymeric material is applied on both sides of the stack, and in that the stack and the polymeric film are subjected to heat and pressure.

As a result of the heat and pressure applied, the polymeric material will melt and penetrate into the holes.

Another preferred embodiment of the above method is characterized in that in step c) the polymeric material is injected by means of injection molding.

In this case the already fluid polymer material will penetrate the holes as a result of a directional injection thereof into said holes.

In a preferred embodiment, at least the negative electrode and the positive electrode are provided with one or more alignment holes.

In the device in which the lithium battery is manufactured, alignment pins or similar aids are present, which cooperate with the corresponding respective alignment holes in order to obtain the desired alignment of the different layers with respect to one another.

In another advantageous embodiment, the pattern at the negative electrode and the positive electrode is provided outside the area of active material of the battery.

This embodiment is particularly suitable if the battery is produced in a process in which the electrodes and separator(s) are unwound from a roll. In such a case the stack of electrodes and separator(s) must be cut in some place to create individual batteries. Moreover, the current collectors of the positive electrodes must be attached to each other, as must the current collectors of the negative electrodes. Besides, the positive current collectors must not contact the negative current collectors. By providing the electrodes with the above pattern, both the alignment of the respective layers and cutting of the stack can be achieved without making contact between the positive and negative current collectors.

A further preferred embodiment of the above method is characterized in that in step b) the pattern of holes in the positive electrode is made to be the same as in step a), and in that before step c) and after stacking together of the negative electrode, the separator and the positive electrode, a pattern of holes is made in the separator, which pattern is the same as in step a).

If the pattern of holes in the positive electrode is made the same as the pattern of holes in the negative electrode, said patterns can be aligned with the aid of the alignment pattern or alignment holes, as mentioned above. Then a pattern of holes can easily be made in the separator, which is stacked between the negative electrode and the positive electrode, so as to align with the positions of the holes in the electrode(s). In this aligned mode, the polymeric material introduced into the holes will form a kind of rivets, which bond together the electrodes and the separator under pressure.

The alternative to the latter embodiment is to provide the separator with holes before stacking. In that case, however, problems can arise with the alignment of holes because of the lack of shape stability of the separator foil.

Advantageously, the pattern of holes in the separator is made by punching, preferably with the aid of hot nails.

In this way the holes in the separator can be made by punching with a 'bed of nails' penetrating the separator in the positions of the holes in the electrodes. In a preferred embodiment, the 'bed of nails' is heated in order to facilitate punching or in order to melt the separator foil during contact, especially when higher temperatures are being used.

In another preferred embodiment, the pattern of holes is made by means of a forced air flow with an air temperature which is higher than the melting temperature of the separator.

Preferably, the diameter of the holes in the separator is equal to or smaller than the diameter of the holes in the negative electrode, and the diameter of the holes in the negative electrode is smaller than the diameter of the holes in the positive electrode.

The formation of dendrites is avoided with such a configuration.

The invention also relates to a method of manufacturing a lithium battery comprising a stack of a negative electrode, a separator, and a positive electrode, which method comprises the steps of applying negative electrode material on a negative current collector so as to form the negative electrode, applying positive electrode material on a positive current collector so as to form the positive electrode, and arranging a separator between the negative electrode and the positive electrode, and which method comprises the following steps:

a) producing a pattern of holes in the negative electrode;
b) producing a pattern of holes in the positive electrode;
c) producing a separator of a polymeric material;
d) subjecting the stack to heat and pressure, causing a part of the polymeric material to penetrate into the holes, whereby the electrodes and the separator are stuck and pressed together. Said method is characterized in that before step d) at least the negative electrode and the positive electrode are provided with a pattern which can be used for the purpose of aligning the electrodes.

As mentioned with respect to the former method, the presence of such a pattern for aligning purposes of the electrodes significantly simplifies the alignment of the layers with respect to each other.

Similarly, preferably at least the negative electrode and the positive electrode are provided with one or more alignment holes. In a particular embodiment, the pattern of the negative electrode and the positive electrode is provided outside the area of active material of the battery.

In the above methods, use is preferably made of porous polymeric material for the polymer films and the separator through which ions are movable, e.g. porous polyethylene. Preferably, the polymeric material is elastic.

The electrode materials can be made by mixing negative or positive active material, conductive material, and binder material, which are all in the form of powder, in a dry process, or in a wet process in which water or an organic solvent is further added. Materials which may be used were mentioned above.

The paste-like mixture obtained is then provided over the current collector, dried and compressed. For this purpose, one of the following coating methods may be generally employed: screen printing, roller coating, doctor blade coating, knife coating, extrusion coating, bar coating, dip coating and squeeze coating. The thickness of the coating layer, which is compressed after drying, generally is in the range of 1 to 1000 $\mu$m.

Pressing of the stack in the above methods is accomplished by simply pressing it for a short period of time between metal plates at a pressure of about $5 \times 10^4$ Pa in an oven at about 110 to 150° C. The operation may also be carried out using calender rollers. After heating, the stack is cooled down to room temperature. Heating and cooling down may also be carried out in a mold with a particular shape, e.g. the shape of the appliance into which the battery is to be fitted.

In the same way as described above, a multilayer stack of layers can be bonded together in one step, thereby obtaining a battery of increased capacity or voltage.

The lithium battery of the invention can be used in various (cordless) applications, for example, notebook personal computers, portable CD-players, portable telephones, paging equipment, video cameras, electric shavers, electric tools, and hearing aids. The lithium battery may be used as a primary or as a secondary battery.

BRIEF DESCRIPTION OF THE DRAWINGS

The invention will be elucidated in greater detail by means of an exemplary embodiment and with reference to the accompanying drawings, in which FIG. 1 diagrammatically shows an electrode provided with a pattern of holes as well as two alignment holes.

DETAILED DESCRIPTION OF THE INVENTION

Exemplary Embodiment

A mixture for the negative electrode material is prepared by mixing 6 g graphite particles having a particle size of 10 $\mu$m as the active positive material, 4.5 g carboxymethyl cellulose (1% aqueous solution) and 0.5 g styrene butadiene rubber (60% dispersion in water) as a binder, and formed into a paste to be applied as a coating on both surfaces of a copper foil current collector. The thickness of the coating is 200 $\mu$m. The thickness of the copper foil amounts to 14 $\mu$m. The pasted current collector is pre-dried at 85° C. for 15 minutes, heat-treated at 110° C. for 3 hours, and then compressed until the thickness has become 110 $\mu$m. The negative electrode is cut out so as to be a square of $2 \times 2$ cm$^2$.

A mixture for the positive electrode material is prepared by mixing 6 g LiCoO$_2$ as the active positive material, 0.18 g acetylene black as a conductive material, 5 g carboxymethyl cellulose (1% aqueous solution) and 0.7 g polytetrafluoroethylene (60% dispersion in water) as a binder, and formed into a paste to be applied as a coating on both surfaces of an aluminum foil current collector. The thickness of the coating is 420 $\mu$m. The thickness of the aluminum foil amounts to 20 $\mu$m. The pasted current collector is pre-dried at 85° C. for 15 minutes, heat-treated at 250° C. for 4 hours, and then compressed until the thickness has become 100 $\mu$m. The positive electrode is cut out so as to be a square of $2 \times 2$ cm$^2$.

A 25 $\mu$m thick porous polyethylene foil is used as a separator.

Figure 1:
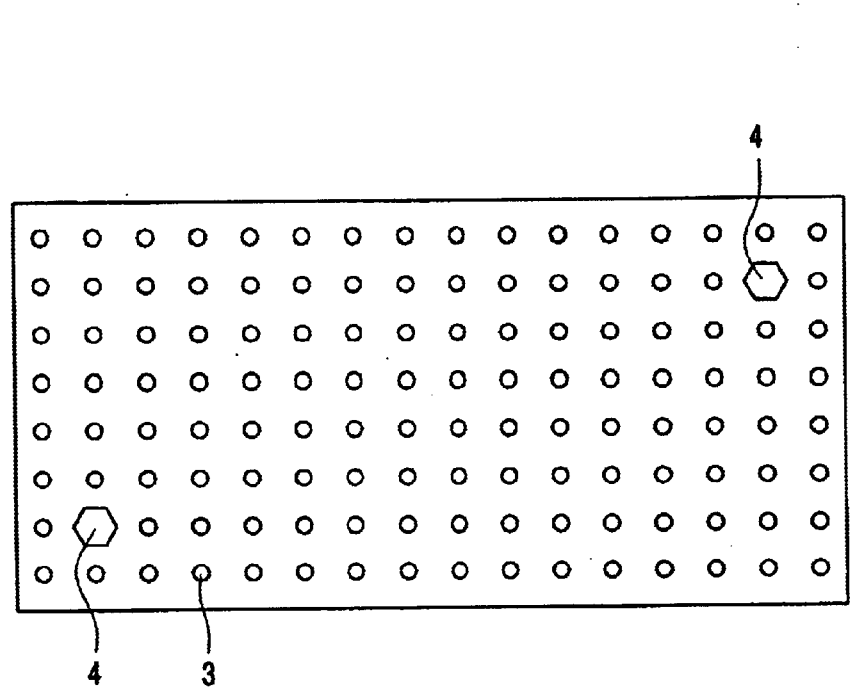

The negative electrode and the positive electrode are each provided with a pattern of holes by mechanical punching. The diameter of the holes is 1 mm. The holes are provided in a two-dimensional array with a mutual hole distance of 5 mm. Moreover, the negative electrode and the positive electrode are each provided with one or more alignment holes, which alignment holes differ in size from the other holes present. In the present example, the alignment holes comprise hexagonal alignment holes with a diameter of about 4 mm. FIG. 1 shows an electrode 2 which is provided with a pattern of holes 3 as well as two alignment holes 4.

In order to manufacture a lithium battery according to the invention, a stack is formed of the negative electrode, the separator, and the positive electrode. As both electrodes are provided with alignment holes, the different layers of the stack, as well as the holes in both the negative electrode and the positive electrode can be aligned with respect to each other. Such alignment can take place with the aid of alignment pins or similar devices which form part of the device in which the battery is being manufactured.

Figure 2A:
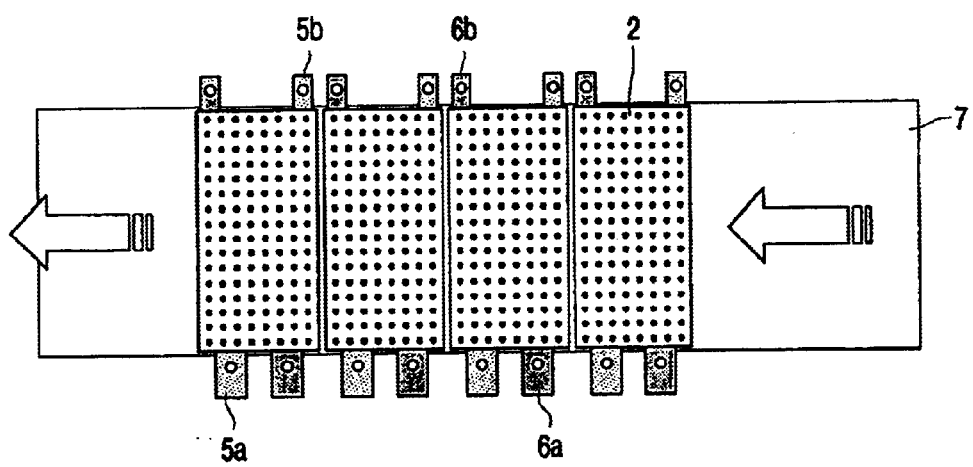
FIGS. 2A and 2B diagrammatically show electrodes which are patterned outside the area of active material, as well as alignment pins which cooperate with such patterns.

Another example of an alignment pattern, provided outside the area of active material of the battery, is shown in FIG. 2. This embodiment is particularly suitable if the battery is produced in a process where electrodes and separator(s) are unwound from a roll. In such a case the stack of electrodes and separator(s) must be cut in some location so as to create individual batteries. Moreover, the current collectors of the positive electrodes must be attached to each other, as must the current collectors of the negative electrodes. Besides, the positive current collectors must not contact the negative current collectors. By providing the electrodes with a pattern outside the active material, both alignment of the respective layers and cutting of the stack become possible without making contact between the positive and negative current collectors. In FIG. 2A, the positive patterns outside the positive electrode material are indicated with reference numerals 5a and 5b, while the negative patterns are indicated with reference numerals 6a and 6b. The separator is indicated with reference numeral 7.

Figure 2B:
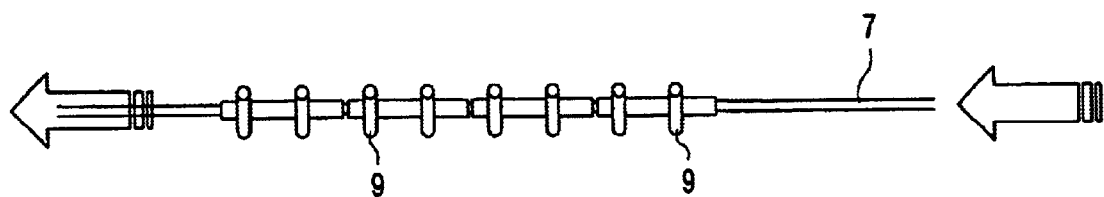

As is shown in FIG. 2B, a stack of negative electrode, positive electrode and separator is aligned with the aid of alignment pins 9 in order to align the different layers and/or the patterns of holes in the different layers with respect to each other. The alignment pins 9 shown in FIG. 2B cooperate with the alignment holes in the patterns 5a and 6a. On the opposite side, other alignment pins may obviously be present, which cooperate with alignment patterns 5b and 6b.

Figure 3:
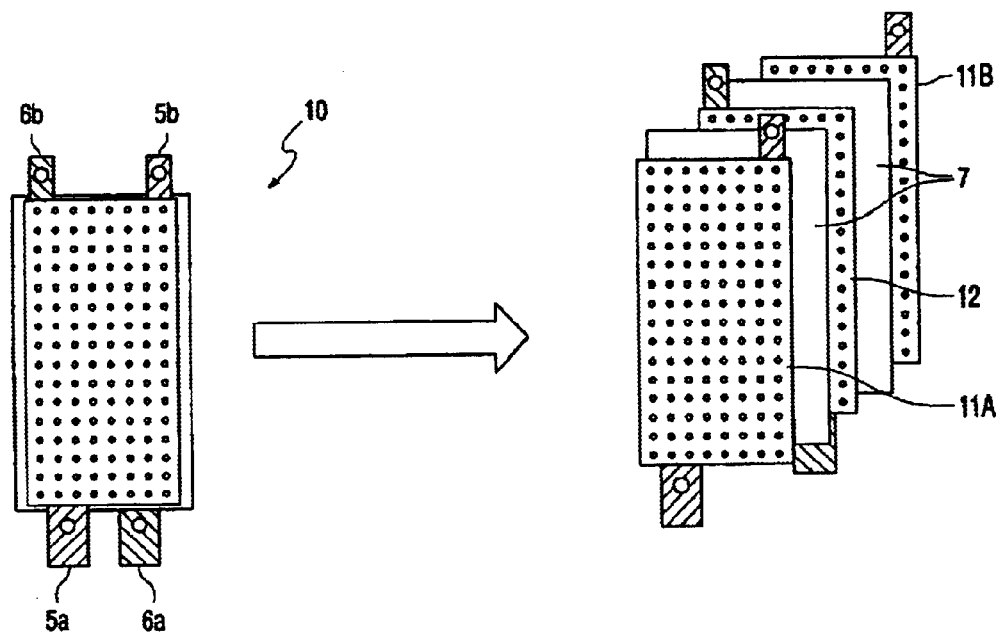
FIG. 3 diagrammatically shows a bicell comprising a stack of, in that order, a positive electrode, a separator, a negative electrode, a separator, and a positive electrode.

In FIG. 3 a bicell 10 is shown, comprising a stack of a positive electrode hA, a separator 7, a negative electrode 12, a separator 7, and a positive electrode hiB. As is shown on the left-hand side of FIG. 3, the pattern 5a,5b,6a,6b outside the active area is such that the positive current collectors do not contact the negative current collectors and vice versa.

Figure 4:
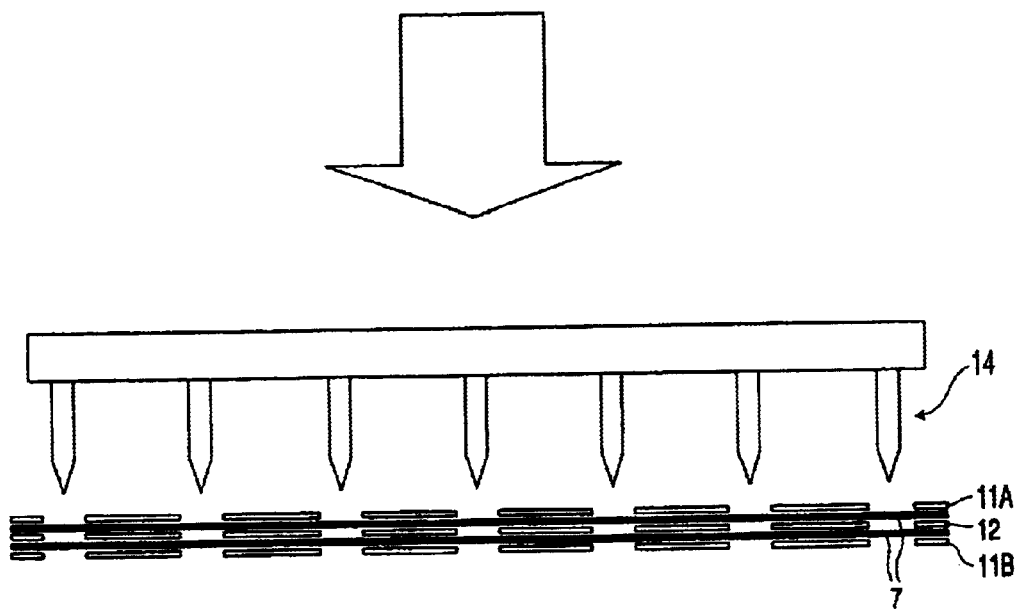
FIG. 4 diagrammatically shows how the holes are made in the separator after the stacking of the different layers according to FIG. 3.

FIG. 4 diagrammatically shows how the holes are made in the separator after the stacking of the different layers according to FIG. 3. As is shown in said Figure, the pattern of holes in the negative electrode and the positive electrodes are aligned. Next, patterns of holes can easily be made in the separators 7 stacked between the negative electrode 12 and the positive electrodes 11A, 11B in accordance with the positions of the holes in the electrode(s). In this aligned mode, the polymeric material which is subsequently introduced into the holes will form a kind of rivets, which bind together the electrodes and the separator under pressure. The patterns of holes in the separator can be made by punching, preferably with the aid of a bed of hot nails 14. Heating of the 'bed of nails' facilitates punching. When even higher temperatures are used, the separator foil will be melted during contact. In another preferred embodiment, the pattern of holes is made by means of a forced air flow with an air temperature which is higher than the melting temperature of the separator.

What is claimed is:

1. A lithium battery comprising at least:
   a negative electrode comprising negative electrode material and a negative current collector;
   a positive electrode comprising positive electrode material and a positive current collector; and
   a separator separating the negative electrode and the positive electrode,
   at least the negative electrode material and the positive electrode material being provided with a pattern of holes which accommodate a polymeric material which sticks and presses the negative electrode, the positive electrode and the separator together, wherein at least the negative electrode and the positive electrode are provided with an alignment pattern which can be used for the purpose of aligning the electrodes, the alignment pattern having at least one alignment hole which is larger than one of said holes of said pattern of holes.

2. A lithium battery as claimed in claim 1, wherein said alignment pattern includes one or more alignment holes.

3. A lithium battery as claimed in claim 2, wherein the one or more alignment holes differ from the pattern of holes.

4. A lithium battery as claimed in claim 1, wherein the alignment pattern is provided outside the area of active material of the battery.

5. A lithium battery as claimed in claim 1, wherein the current collectors are provided with a further pattern of holes overlapping the pattern of holes in the electrode materials, and wherein the holes of both patterns are tilled with the polymeric material.

6. A lithium battery as claimed in claim 1, wherein the separator is provided with a further pattern of holes overlapping the pattern of holes in the electrode materials, and wherein the holes of the patterns are filled with the polymeric material.

7. A lithium battery as claimed in claim 1, further comprising a multilayer stack of layers of a negative electrode, a separator, and a positive electrode.

8. A lithium battery as claimed in claim 1, wherein a surface of the negative electrode and/or a surface of the positive electrode facing away from the separator is provided with a resilient foam layer.

9. A method of manufacturing a lithium battery comprising a stack of a negative electrode, a separator, and a positive electrode, which method comprises the steps of applying negative electrode material on a negative current collector so as to form the negative electrode, applying positive electrode material on a positive current collector so as to form the positive electrode, and arranging a separator between the negative electrode and the positive electrode, and which method comprises the following steps:
   a) producing a first pattern of holes in the negative electrode;
   b) producing a second pattern of holes in the positive electrode;
   c) providing a polymeric material on the stack such that the polymeric material penetrates the holes of said first pattern and said second pattern, whereby the negative electrode, the positive electrode and the separator are bonded and pressed together, wherein before step c) at least the negative electrode and the positive electrode are provided with an alignment pattern which can be used for the purpose of aligning the electrodes, wherein the alignment pattern has at least one alignment hole which is larger than one of said holes of said first pattern and said second pattern.

10. A method of manufacturing a lithium battery as claimed in claim 9, wherein in step c) a film of polymeric material is applied on both sides of the stack, and wherein the stack and the polymer film are subjected to heat and pressure.

11. A method of manufacturing a lithium battery as claimed in claim 9, wherein in step c) the polymeric material is provided by means of injection molding.

12. A method of manufacturing a lithium battery as claimed in claim 9, wherein said alignment pattern includes one or several alignment holes.

13. A method of manufacturing a lithium battery as claimed in claim 9, wherein the alignment pattern is provided outside the area of active material of the battery.

14. A method of manufacturing a lithium battery as claimed in claim 9, wherein in step b) the second pattern of holes in the positive electrode is made to be the same as in step a), and wherein before step c) and after stacking together of the negative electrode, the separator and the positive electrode, a third pattern of holes is made in the separator, wherein said third pattern is the same as in step a).

15. A method of manufacturing a lithium battery as claimed in claim 14, wherein the third pattern of holes in the separator is made by punching.

16. A method of manufacturing a lithium battery comprising a stack of a negative electrode, a separator, and a positive electrode, which method comprises the steps of applying negative electrode material on a negative current collector so as to form the negative electrode, applying positive electrode material on a positive current collector so as to form the positive electrode, and arranging a separator between the negative electrode and the positive electrode, and which method comprises the following steps:

a) producing a first pattern of holes in the negative electrode;
  b) producing a second pattern of holes in the positive electrode;
  c) providing a polymeric material on the stack such that the polymeric material penetrates the holes of said first pattern and said second pattern, whereby the negative electrode, the positive electrode and the separator are bonded and pressed together, wherein before step c) at least the negative electrode and the positive electrode are provided with an alignment pattern which can be used for the purpose of aligning the electrodes, wherein in step b) the second pattern of holes in the positive electrode is made to be the same as in step a), and wherein before step c) and after stacking together of the negative electrode, the separator and the positive electrode, a third pattern of holes is made in the separator, wherein said third pattern is the same as in step a), wherein the third pattern of holes in the separator is made by punching, and wherein the punching is performed with the aid of hot nails.

17. A method of manufacturing a lithium battery comprising a stack of a negative electrode, a separator, and a positive electrode, which method comprises the steps of applying negative electrode material on a negative current collector so as to form the negative electrode, applying positive electrode material on a positive current collector so as to form the positive electrode, and arranging a separator between the negative electrode and the positive electrode, and which method comprises the following steps:
  a) producing a first pattern of holes in the negative electrode;
  b) producing a second pattern of holes in the positive electrode;
  c) providing a polymeric material on the stack such that the polymeric material penetrates the holes of said first pattern and said second pattern, whereby the negative electrode, the positive electrode and the separator are bonded and pressed together, wherein before step c) at least the negative electrode and the positive electrode are provided with an alignment pattern which can be used for the purpose of aligning the electrodes, wherein in step b) the second pattern of holes in the positive electrode is made to be the same as in step a), and wherein before step c) and after stacking together of the negative electrode, the separator and the positive electrode, a third pattern of holes is made in the separator, wherein said third pattern is the same as in step a), and wherein the third pattern of holes is made by means of a forced air flow.

18. A method of manufacturing a lithium battery comprising a stack of a negative electrode, a separator, and a positive electrode, which method comprises the steps of applying negative electrode material on a negative current collector so as to form the negative electrode, applying positive electrode material on a positive current collector so as to form the positive electrode, and arranging a separator between the negative electrode and the positive electrode, and which method comprises the following steps:
  a) producing a first pattern of holes in the negative electrode;
  b) producing a second pattern of holes in the positive electrode;
  c) providing a polymeric material on the stack such that the polymeric material penetrates the holes of said first pattern and said second pattern, whereby the negative electrode, the positive electrode and the separator are bonded and pressed together, wherein before step c) at least the negative electrode and the positive electrode are provided with an alignment pattern which can be used for the purpose of aligning the electrodes, and wherein the diameter of the holes in the separator is equal to or smaller than the diameter of the holes in the negative electrode, and the diameter of the holes in the negative electrode is smaller than the diameter of the holes in the positive electrode.

19. A method of manufacturing a lithium battery comprising a stack of a negative electrode, a separator, and a positive electrode, which method comprises the steps of applying negative electrode material on a negative current collector so as to form the negative electrode, applying positive electrode material on a positive current collector so as to form the positive electrode, and arranging a separator between the negative electrode and the positive electrode, and which method comprises the following steps:
  a) producing a first pattern of holes in the negative electrode;
  b) producing a second pattern of holes in the positive electrode;
  c) producing a separator of a polymeric material;
  d) subjecting the stack to heat and pressure, causing part of the polymeric material to penetrate into the holes of said first pattern and said second pattern, whereby the electrodes and the separator are bonded and pressed together, wherein before step d) at least the negative electrode and the positive electrode are provided with an alignment pattern which can be used for the purpose of aligning the electrodes, wherein the alignment pattern has at least one alignment hole which is larger than one of said holes of said first pattern and said second pattern.

20. A method of manufacturing a lithium battery as claimed in claim 19, wherein said alignment pattern includes one or several alignment holes.

21. A method of manufacturing a lithium battery as claimed in claim 19, wherein the alignment pattern is provided outside the area of active material of the battery.

* * * * *